July 23, 1968     P. L. CIACCIO     3,393,415
SEWER RODDING MACHINE WITH WOBBLE REEL
Filed May 8, 1967     3 Sheets-Sheet 3
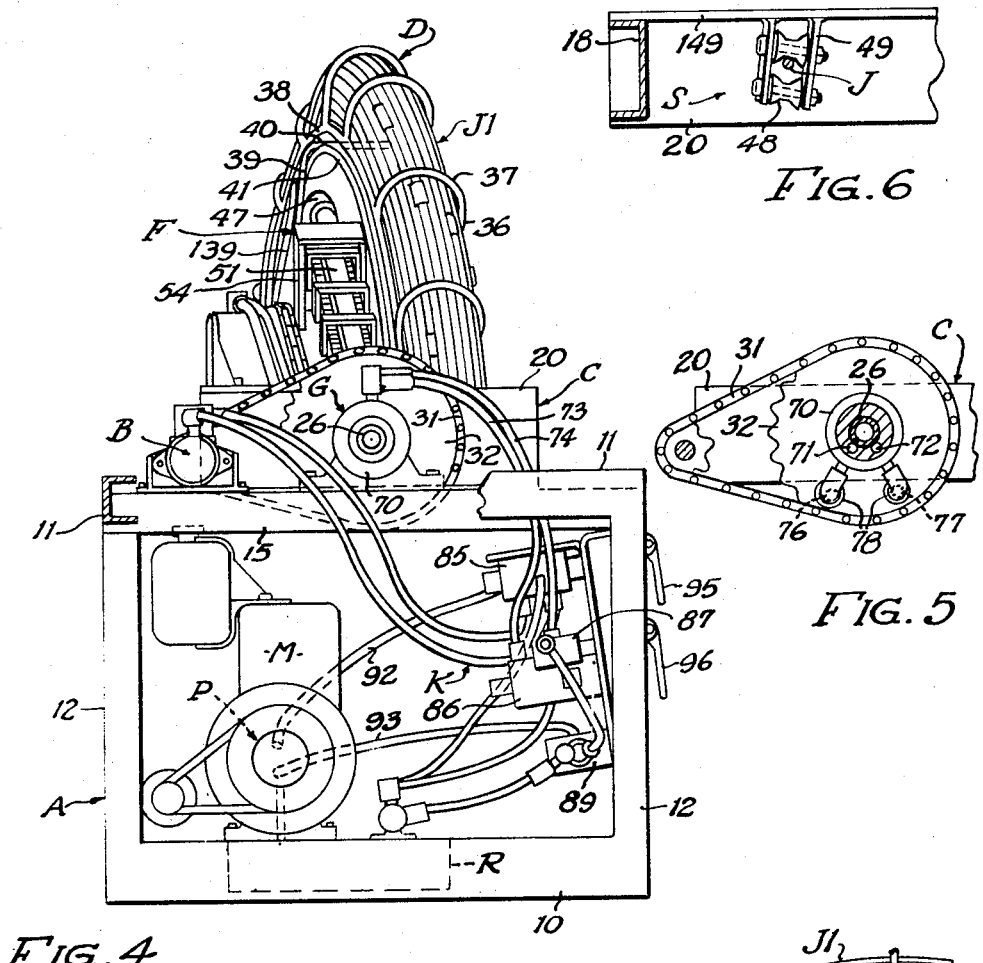
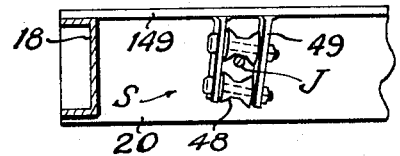
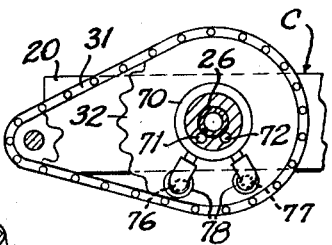
FIG. 4
FIG. 5
FIG. 6
FIG. 7
INVENTOR.
PETER L. CIACCIO
BY
Lynn H. Latta
—ATTORNEY—

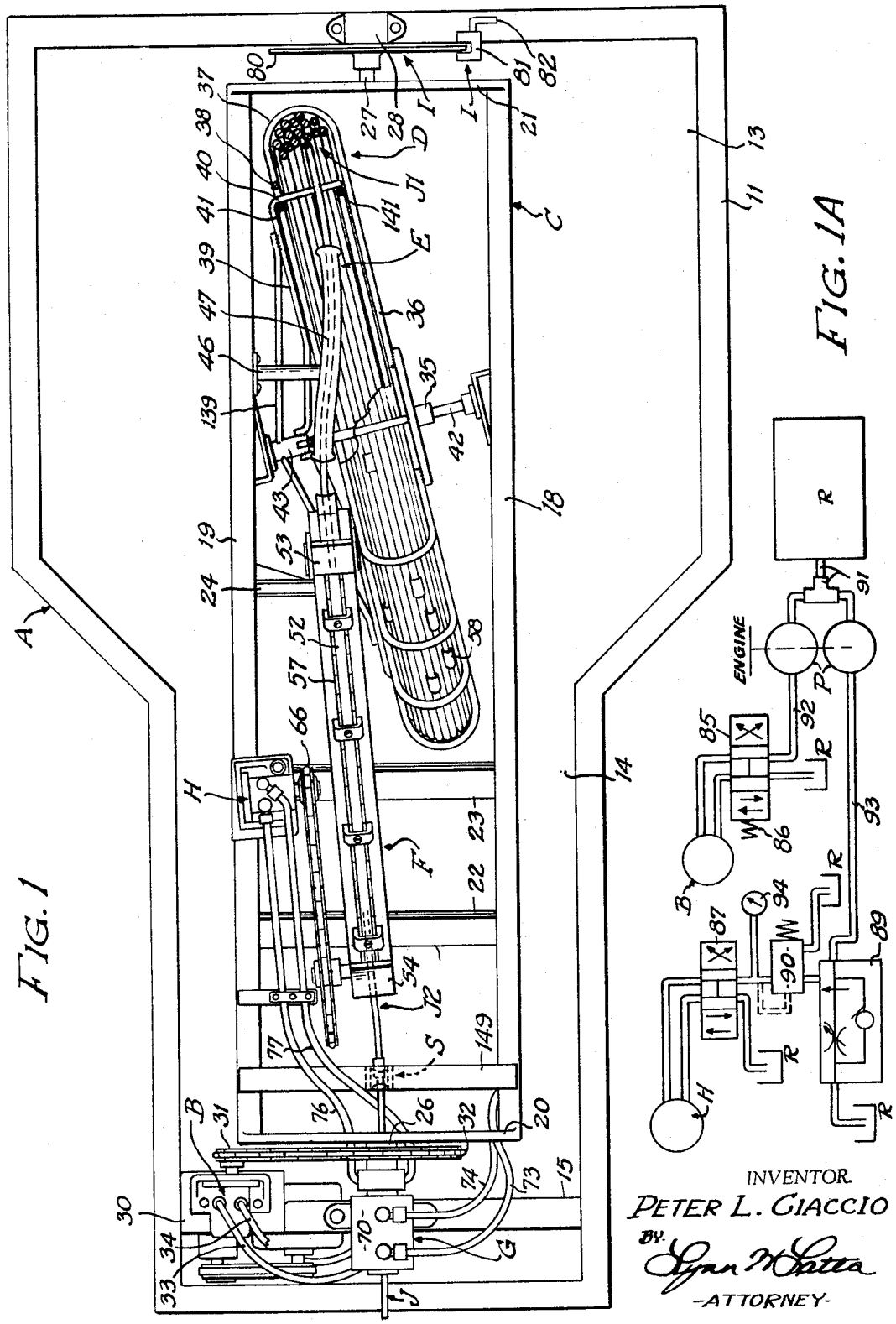

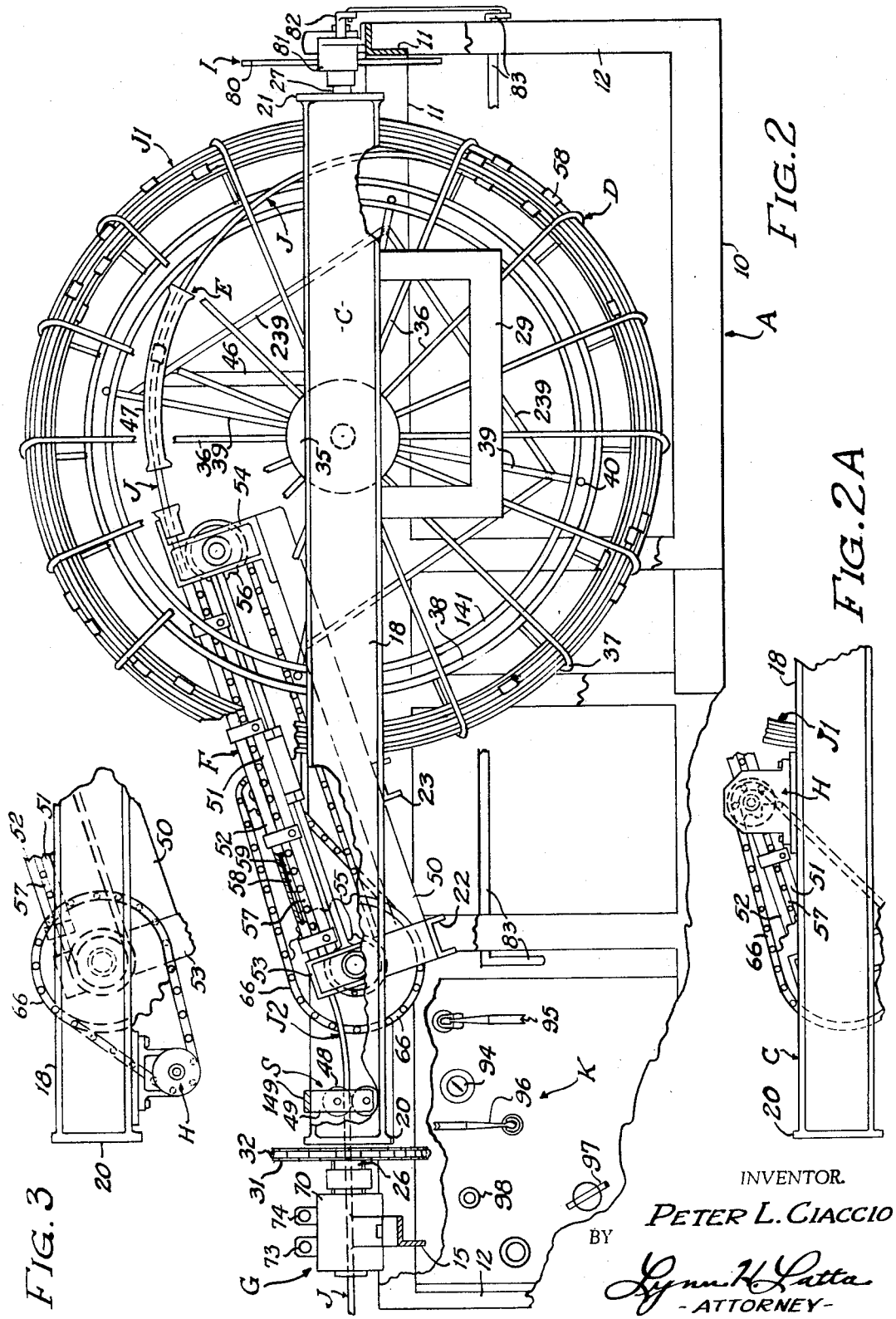

United States Patent Office 3,393,415
Patented July 23, 1968

3,393,415
SEWER RODDING MACHINE WITH
WOBBLE REEL
Peter L. Ciaccio, Los Angeles, Calif., assignor to Flexible,
Inc., Pittsburgh, Pa., a corporation of Delaware
Filed May 8, 1967, Ser. No. 636,838
10 Claims. (Cl. 15—104.3)

ABSTRACT OF THE DISCLOSURE

Disclosed herein is a sewer rod feeding machine having a rod-storage reel mounted in a rotating carriage and turning therewith so that sewer rod fed tangentially from the reel may be rotated for driving a cleaning tool in a sewer. The reel is mounted for rod-feeding rotation on an axis that is generally transverse to the carriage axis, but diagonally disposed so that the reel extends diagonally within the carriage and the rod passes diagonally through an opening in one side of the reel in a plane generally parallel to the carriage axis so that the rod may be fed in as nearly a straight line as possible from the reel to a tubular guide at the forward end of the carriage through which it is issued from the machine on the carriage axis. Between the reel and the tubular guide, a rod feed unit is disposed in an inclined position determining the path of feed of the rod from a point of tangency to the point of entry into the tubular guide. The feed unit is driven by a hydraulic motor mounted on the carriage and the feed unit and motor both turn with the carriage. The feed unit may be of a chain drive type or a roll drive type, depending on whether a jointed rod or a continuous rod is to be fed.

Background of invention

Sewer rodding machines utilizing a roll feed unit mounted in and turning with a rotating carriage, the feed unit being driven by a hydraulic motor likewise mounted on and turning with the carriage, which is independently rotated by a hydraulic motor mounted on a main support frame, are known and used in the art. U.S. Patent No. 3,176,335 disclosed such a machine and also discloses an alternative arrangement wherein a flat reel for storing and feeding rod tangentially from its periphery between cam-opened retainer fingers, is mounted in a rotating carriage with its plane parallel to or coincident with the carriage axis and with the reel axis at right angles to the carriage axis. This type of reel is designed to operate as a rod-feeding device as well as a storage reel and hence is power rotated on its own axis, dispensing with a separate rod feed unit. Where a separate feed unit has been used, it has been customary to utilize a conical storage reel, aligned and turning with the feed unit carriage. Such a machine is quite long, equal to the combined lengths of both units. A flat pancake type reel periphery defining a rod storage chamber from which the rod is withdrawn inwardly (instead of from the periphery) and exits through one side of the reel, the other side of the reel being closed and having a central hub which mounts the reel for rotation, is disclosed in O'Brien Patent No. 2,730,740.

Stewart Patent No. 3,098,251 discloses a rodding machine with a reel disposed in a diagonal position in a carriage which rotates on the axis on which the rod is fed from the machine, and which is compact axially, but utilizes the rotation of the reel by a drive chain encircling and directly gripping the coil of rod in the periphery of the reel in order to feed the rod from the machine, and does not provide for an independent rod feed unit. The rod emerges from the periphery of the coil in contrast to the present invention in which the rod emerges from the interior of the coil, and the Stewart reel has an open periphery, closed only by the encircling drive chain, as contrasted to the closed periphery of the reel of the present invention. The Stewart machine has not proved to be commerciall satisfactory.

Summary of invention

As an improvement over the hydraulic motor-driven machines referred to above, this invention utilizes a pancake type reel mounted in an elongated carriage with its plane diagonal (instead of parallel) to the carriage axis, and with its open side facing forwardly toward a tubular guide on the carriage axis, through which the rod exits from the machine, with a feed unit interposed between the reel and the guide. Between the reel and the guide is an elongated rod feed unit which may be alternatively of a roll type or a chain type. By virtue of the diagonal position of the reel, the reel and feed unit may overlap along the carriage axis, thus shortening the overall length of the machine. This especially is important where the feed unit is of the relatively long chain type, which, in the present invention, overlaps nearly half the diameter of the reel, and may actually project into the mouth of the reel. The diagonal arrangement of the reel also makes it possible for the rod to exit from the reel generally parallel to the rod axis so as to be easily aligned with the exit guide, and is utilized with the shorter roll type feed for this purpose as well as to standardise on a common machine structure in which either type of feed can be installed interchangeably, depending on whether continuous or jointed rod is to be utilized by the machine. The feed unit is disposed in a position inclined with relation to the carriage axis, with one end adjacent the exit guide and disposed substantially at the carriage axis, and with its other end laterally displaced from the carriage axis toward the periphery of the reel, whereby the longitudinal axis of the feed unit is substantially tangent to the inner periphery of the coil of rod stored in the reel, and the rod will thus traverse smoothly from the reel into the feed unit with a minimum of bending.

Description

Consistent with the foregoing, the invention has among its objects to provide a sewer rodding machine having the following combination of advantageous features:

(1) Of maximum simplicity and sturdiness of construction and freedom from breakdown and operational difficulties;

(2) Longitudinally compact;

(3) Having the wider operational flexibility of independent dual hydraulic drives in the control and coordination of rod rotation and rod feed at varying rotational and linear speeds and varying torque and linear push and pull applied to the rod, depending upon varying conditions encountered in a sewer;

(4) Having a diagonally positioned reel, feeding inwardly and diagonally through an open side thereof;

(5) Having an elongated rod feed unit and reel disposed in overlapping relation such as to improve longitudinal compactness;

Further objects are:

(a) To provide an improved arrangement for feeding sewer rod from a reel discharge point which is offset both above and laterally from the axis of rotation of a carriage in which the reel is mounted for rotation in a plane diagonal with reference to the axis, wherein the rod is straightened as it becomes tangent to and leaves the machine along this axis of carriage rotation.

(b) To provide a rodding machine which, in addition to features 1–5 above, embodies a rod feed unit disposed diagonally with reference to the rotational axis of a rotating carriage in which both reel and feed unit are mounted, whereby the rod may feed tangentially from the reel into the feed unit and thence to the carriage axis so as to exit from the machine along the carriage axis with a minimum of bending.

These and other objects will become apparent in the ensuing specifications and appended drawings, wherein:

FIG. 1 is a plan view, partially in section, of a sewer rodding machine embodying the invention, utilizing a chain type rod unit;

FIG. 1A is a schematic diagram of the hydraulic circuit of the machine;

FIG. 2 is a side elevational view of the same, with portions broken away;

FIGS. 2A and 3 are fragmentary elevational views of modified drives to the rod feed unit;

FIG. 4 is a front end elevational view, partially in section, of the machine of FIGS. 1 and 2;

FIG. 5 is a cross-sectional view taken on line 5—5 of FIG. 2;

FIG. 6 is a detail of the rod-straightening guide, and

FIG. 7 is a fragmentary side elevational view of a form of the invention utilizing a roll type rod feed unit.

Referring now to the drawings in detail, and in particular to FIGS. 1 and 2, I have shown therein, as an example of one form in which the invention may be embodied, a sewer rodding machine comprising, in general, a support frame A which may be mounted on wheels (not shown) for transport between jobs; a hydraulic motor B driving a carriage C mounted at its respective ends for rotation about its longitudinal axis; a reel D for storing tool drive rod in its periphery; traverse guide E for deflecting the rod diagonally from the inner periphery of a coil of rod within the reel, through an open side of the reel; an elongated chain feed unit F for feeding the rod from the reel into a sewer and vice versa; a hydraulic motor H for driving the feed unit F; a combined fluid coupling and projection guide unit G mounting the forward end of carriage C on support frame A; a combined trunnion and brake unit I connecting the rear end of carriage C to frame A; and a rod-straightening unit S for straightening the rod while guiding it into the guide E. Reel D rotates on an axis that is generally transverse with reference to the rotational axis defined by gland G and trunnion unit I. Carriage C is rotated on this carriage axis by drive from motor B, and reel D turns bodily with carriage C while rotating on its own axis in response to the action of feed unit F in withdrawing tool-drive rod J from the reel and pushing it forwardly through gland G into a sewer, or withdrawing the rod from the sewer and pushing it back into the reel. The bodily turning of the reel with the carriage effects rotation of the rod and a cleaning tool driven by its forward end within a sewer. A group of controls K on a control panel can be operated so as to independently control the hydraulic motors B and H for selectively advancing or retracting the drive rod J while rotating it forwardly, or in reverse, or without rotation of the rod, depending on the requirements of conditions encountered in a sewer. Alternatively, the controls can be operated so as to effect rotation of the rod J in either direction without either advancing or retracting the rod. Control over speeds of rotation and of linear feed is also provided. The amounts of torque and of linear force applied to the rod J can also be controlled, all as explained more in detail hereinafter. A pump P, driven by an engine M (e.g. gasolene engine) provides hydraulic fluid under pressure to motors B and H as called for by operation of controls K.

In detail, frame A is of box form including a base frame 10 and a top frame 11 integrally joined by vertical legs 12, the top frame 11 (and optionally the base frame 10) being of keyhole plan form so as to provide in the rear half of the frame a relatively wide space 13 with sufficient clearance for the reel D to turn therein without interference; and in the forward half of the frame a relatively narrow space 14, just wide enough to accommodate the carriage C and the other mechanism mounted therein. In addition to end cross bars, top frame 11 includes near its front end a cross bar 15 on which gland unit G and motor B are mounted.

Carriage C is relatively long and narrow, including parallel side beams 18 and 19, end cross bars 20 and 21, and intermediate cross bars 22 and 23 and a bracket 24, on which feed unit F is mounted. To the center of front cross bar 20 is secured a tubular trunnion 26 (part of gland G) which is journalled in a bearing portion of gland G. To the rear cross bar 21 is secured a trunnion 27 which is journalled in a bearing 28 on the rear cross bar of the top frame 11 of support frame A. Carriage C includes a pair of counterweights 29 on the opposite side of its axis from feed unit F, for substantially counterbalancing the feed unit and the traverse guide unit E during carriage rotation.

Motor B is a high torque positive displacement hydraulic motor such as the Char-Lyn. It has a mount bracket which is mounted on a plate 30 secured to cross bar 15 of the support frame A. Secured to the shaft of motor B is a sprocket which drives a chain 31 trained around a sprocket 32 secured on the tubular trunnion 26, through which rotation is transmitted to carriage C. For adjustment purposes, the motor bracket is shiftable to a limited extent with respect to its mounting bolts and is secured in a selected position of adjustment on plate 30 by tightening the bolts. Hydraulic hoses 33 and 34 provide fluid line connections from control group K to motor B.

Reel D is preferably of cage form, of welded rod construction, including a closed side consisting of a spider embodying a hub 35 and spokes 36 radiating therefrom in a common plane; a peripheral rod-storage portion consisting of loops 37 extended from the ends of respective spokes 36 and returning radially inwardly, and a ring 38 secured to these inturned ends of loops 37 and defining a large circular opening, concentric with the reel axis, within which is defined the reel mouth for transverse of the rod J out of and into the reel. The radial depth of loops 37 from ring 38 to the periphery of the reel is such as to define a toroidal reel chamber within loops 37, of radial depth sufficient to satisfactorily contain a coil J1 of rod of the maximum length that may be called for in the use of the machine. The reel chamber is defined interiorly by a fixed guard frame comprising a plurality of support spokes 39 (four are shown) secured to and fixedly supported by a bearing 43 in which one end of the reel axle is journalled. The spokes 39 radiate outwardly to a radius just inside the ring 38, where they are bent at right angles to provide a plurality of axially-extending guard bars 40 at the inner radius of the reel chamber. Spacer rings 41 and 141 are secured to the respective ends of bars 40 to hold them in equal spacing circumferentially, and to brace the guard structure. Bracing spokes 139 are secured to bearing 43 in axially-spaced relation to spokes 39, and are secured to the latter near their outer ends to brace the guard frame against axial shifting. Tie braces 239 are secured to spokes 39 and extend diagonally therebetween on three sides of the guard frame, the fourth being open adjacent the upper end of feed unit F to avoid interference therewith. In the open side of the reel, the spacer ring 41 of the guard frame, the fourth being open adjacent the upper end passes in leaving and intering the reel. Reel D is mounted by means of the hub 35 on a shaft 42 the ends of which are journalled in bearings 43 and 143 on brackets secured to the respective side beams 18, 19 of carriage C, in staggered positions such as to dispose the reel axis in a diagonally transverse position, and to correspondingly locate the plane of the reel D in a diagonal position extending predominantly in longitudinal relation to the carriage axis while traversing the carriage from side to side. The reel mouth faces forwardly to a minor extent, sufficient for the rod J to exit from the reel in a substantially vertical plane which is nearly parallel to the carriage axis and intersects it at the forward end of carriage, but diverges from such parallelism at the open side of the reel, sufficiently to establish substantial tangency with the rod coil J1 near the rear extremity thereof, located near one side of the carriage. This is best seen in FIG. 2.

Traverse guide E comprises a bracket post 46 secured to carriage side frame beam 19 and inclined upwardly to a point within the reel mouth and spaced somewhat below ring 41, where it supports a guide tube 47 secured to its upper end in crossed relation thereto, defining a T. Tube 47 is arcuate, extending in a generally vertical plane generally parallel to the carriag axis and is arched upwardly, with its forward end substantially tangent to the longitudinal feed axis of feed unit F and its rear end approaching tangency to the inner periphery of rod coil J1 (FIG. 2). It extends diagonally through the reel opening, its rear end inside the reel and its forward end outside the reel. Thus it functions to guide the rod J in traversing from inside to outside the reel through the opening without dragging against mouth ring 41 or any other portion of the reel.

Rod-straightening guide S (FIG. 6) comprises a pair of annularly-grooved rollers 48 mounted in a clevis 49 in spaced opposed relation with their common bisector plane tilted with reference to the plane of carriage C and diagonal with reference to the axis of rotation of carriage C. This is accomplished by positioning the clevis 49 on a vertically-tilted major axis, with its bisector plane slightly skewed around this axis from parallelism with the carriage rotational axis, approximately as shown in FIG. 6, so that the axis of the upper roller 48 is normal to the common plane of the curved transversing portion of rod J including the portions emerging from feed unit F and entering guide-coupling G as indicated at J2. The upper roller 48 thus exerts pressure against this traversing portion of the rod, such as to bow it, at J2, in said common plane, into reverse curvature with reference to the curvature of the rod in reel D, such that as the rod emerges from guide-coupling G, free of bending stresses, it will have been bent by the reverse bowing into a straight rod which will transmit torque to a rotary sewer tool with maximum efficiency. Clevis 49 is mounted to carriage C by a cross bar 149.

Feed unit F is a type, generally like that shown in Ciaccio Patent No. 3,120,017 comprising an elongated frame embodying a base beam 50 parallel to a pair of spaced guide bars 51 and 52, the latter being an inverted channel at the top of the frame, secured to and extending between end posts 53 and 54, in which are journalled respective sprockets 55, 56. A chain 57 has an upper stretch confined between guide bars 51, 52 while engaging and driving a stretch of the rod J confined between said upper chain stretch and the guide bar 51. In the area of confinement between the upper chain stretch and guide bar 51, couplings 58 on rod J are engaged by notched (bifurcated) drive lugs 59 which straddle the rod sections that are joined by the couplings 58. Thus the rod is fed linearly in projecting or retracting direction, depending on the direction of rotation of sprockets 55, 56. The feed unit F overlaps the forward half of reel D on the open side thereof, and its rear end projects into the reel mouth defined within.

Base beam 50 is mounted upon the carriage cross-bars 22 and 23 and bracket 24, which parts are disposed at graduated elevations so as to position feed unit F along an inclined longitudinal axis of feed of rod J from traverse guide E to an exit guide embodied in gland G. The inclination of this axis is such as to establish tangency of the forward end of this feed axis at the rear end of gland G, through a short bowed stretch of the rod at J2, and to establish tangency of the rear end of this inclined feed axis with the stretch of rod J issuing from or entering the forward end of traverse guide E, which is at a substantial height above the center of the reel.

Hydraulic motor H may be of the same type as motor B, with high torque drive characteristics. It has a mount bracket adjustably mounted on carriage side beam 19. The motor H, through a sprocket and chain drive 66, drives the shaft of feed unit sprocket 55, for operating the feed unit F in rod-projecting or rod-retracting direction, depending on the direction of drive. To better counter-balance the weight of feed unit F, which is offset toward carriage side frame member 19, motor H may be mounted on the opposite side member 18, on the opposite side of the plane of carriage B from feed unit F (the underside of member 18 when in the position shown) as in FIG. 3, but preferably on the "upper" side, as near as possible to reel D as in FIG. 2A. The latter position provides good counterbalancing and also provides ample room for a sufficiently long drive chain 66 to accommodate such adjustment of motor H on its mounting plate as may be required for properly tensioning chain 66 and aligning it properly with its sprockets. Limited adjustability of the motor base on its mounting plate, secured to carriage side member 18, is therefore provided.

Gland G may be of the type disclosed in the above-mentioned Patent No. 3,176,335 including the tubular trunnion element 26 and a cylindrical jacket 70 having a suitable bearing liner (not shown) in which element 26 is rotatably mounted, and having suitable internal rotatable hydraulic connections (not shown) between a pair of hydraulic passages 71 and 72 (FIG. 5) in trunnion element 26 and a pair of external fittings on jacket 70, to which are coupled respective hydraulic hoses 73 and 74, extending to control group K. Tubular trunnion 26 includes an integral collar portion 75 providing for suitable hydraulic connections from its passage 71, 72 and a pair of hydraulic hoses 76, and 77. Hoses 76, 77 extend through apertures 78 in carriage-drive sprocket 32 and beneath cross bar 20 of carriage C, thence to feed drive motor H.

Trunnion-brake unit I includes a brake disc 80 secured on trunnion 27, a clamping jaw unit 81 operated by a lever 82 and an operating linkage 83 connecting the lever 82 to an operating handle 84 adjacent control group K.

Control group K includes a reversible valve 85 for controlling motor B to effect rotation of carriage C selectively in either direction and to stop rotation. Valve 85 may optionally include flow volume control means 86 for varying the speed of rotation of the cleaning tool in a sewer. A valve 87 is provided for controlling the linear feed motion of rod J selectively in advancing and retracting directions, and to stop the feed. A dump valve 89 is provided for controlling the speed of the rod feed motor H. A pressure meter 94 may be connected to line controlling the hydraulic pressure in the hydraulic lines so as to control the torque applied in the rotation of the rod J, and the push or pull applied to the rod in advancing or retracting it as the case may be. Valve 90 may be a pressure relief type of valve, bypassing fluid back to a reservoir R at a pressure exceeding a selected pressure which may be regulated by operation of the valve, and thus applying the selected pressure to the fluid in the circuit so as to control the amount of push that is applied to the rod as it is fed into the sewer or pulled back.

Pump P may be a dual pump, i.e., two pumps receiving fluid from reservoir R in parallel, as at 91 and delivering their separate outputs to carriage-drive motor B through valve 85 and a feed line 92, and through a separate line 93 and the valves 89, 90 and 87 therein, to the rod-feed motor H. A pressure meter 94 may be connected to line 93, to indicate rod-feed pressure. In general, this hydraulic circuit is similar to that disclosed in the aforesaid Patent No. 3,176,335.

The operation of the machine will be largely apparent from the foregoing description. Separate manual control handles 95, 96, 97 and 98 are provided for operating valves 85 87, 89 and 90 respectively. Thus carriage turning (and hence rod rotation) can be controlled by operation of valve 85, with control over direction of rotation, starting, stopping and (where flow volume control is included in the valve) speed of rotation. Independently of such control of rotation, the feed of the rod can be controlled as to direction, speed and applied push or pull, by operation of valves 87, 90 and 89 respectively.

As shown in FIG. 7, where continuous rod J3, without joints, is utilized by the machine, the feed unit F2 may be a roll feed unit such as that disclosed in the aforesaid Patent No. 2,176,335, a hydraulic motor B2 being mounted directly on the frame 99 of unit F2 and directly driving the shaft of one of the rolls of several pairs of rod-gripping grooved rolls 100, the remaining rolls being driven by a chain of gears 101.

Feed unit F2 is interchangeable with feed unit of FIGS. 1–5. In order to standardise on the remainder of the machine, it is made the same (as to dimensions and arrangement of parts) for the roll-feed unit F2 as for the chain-feed unit F, although the roll-feed unit may be shorter as shown. Also there may be some over-lapping of the reel and feed unit, in the arrangement of FIG. 7, though not necessarily as much as with the chain feed unit. Feed unit F2 may be mounted in carriage C in an inclined position so as to feed the rod downwardly from the upper area of reel D to the carriage axis. Alternatively, feed unit F2 may be mounted in the extreme front end of carriage B, immediately adjacent front cross bar 20, with the tubular core of coupling guide G extending through and secured in the front end frame member of unit F2, and with rod-straightening unit S and its supporting cross bar moved rearwardly to a position just rearward of unit F2 and functioning to straighten the rod before it enters the unit F2 from reel D.

I claim:
1. In a sewer rodding machine including:
a support frame;
an elongated carriage having means at forward and rear ends thereof mounting it in said support frame for rotation about its longitudinal axis;
said carriage including a tubular rod guide extending through the forward carriage-mounting means, for projection and retraction of sewer tool drive rod;
drive means operating between said support frame and said carriage for turning said carriage about its said axis, thereby transmitting tool-driving rotation to said rod;
a rod-storage reel turning with said carriage and arranged for reeling and unreeling of said rod and feeding the rod longitudinally to and from said guide;
a rod-feed unit mounted in said carriage between said reel and said guide and engageable with said rod to effect said feeding thereof while turning with said carriage;
and a drive motor mounted on said carriage, turning therewith, and transmitting drive to said rod-feed means:
the improvement which comprises:
said reel being of pancake form, including a peripheral portion for internal storage of rod and one side portion including a supporting hub, and having in its opposite side a substantially circular mouth for traverse of the rod out of and into the reel diagonally of the plane of the reel; and
means rotatably supporting said reel in said carriage by means of said hub for rotation on an axis extending diagonally across said carriage whereby said reel is disposed with its said plane extending diagonally with reference to said carriage axis and with its said mouth facing diagonally forwardly, whereby said rod traverses said mouth diagonally in a plane substantially parallel to said carriage axis.

2. A sewer rodding machine as defined in claim 1, said rod-feeding unit being disposed generally between said reel and said guide in an inclined position with its forward end adjacent the carriage axis and its rear end disposed between the carriage axis and the periphery of the reel, the reel axis traversing the carriage near the carriage axis.

3. A rodding machine as defined in claim 1, wherein said reel has one side of its forward portion disposed adjacent one side of the carriage and its other side substantially spaced from the other side of the carriage, and wherein said rod feed unit has its rear end portion in overlapping relation to the forward portion of said reel between said other side of the reel and said other side of the carriage.

4. A rodding machine as defined in claim 1, wherein said reel has one side of its forward portion disposed adjacent one side of the carriage and its other side substantially spaced from the other side of the carriage, and wherein said rod feed unit has its rear end portion extending diagonally into said mouth.

5. A rodding machine as defined in claim 1, wherein said carriage comprises an open frame having spaced longitudinal side members disposed substantially in a common plane with its axis, and wherein said reel-supporting means comprises a shaft disposed substantially in said plane with its respective ends supported by the respective frame side members; said drive motor being mounted on a side member of said carriage frame and driving said rod-feed unit through a chain drive.

6. A rodding machine as defined in claim 1, wherein said carriage drive means comprises a sprocket secured to the forward end of said carriage, a drive motor mounted in said support frame, and a drive chain driving from said motor to said sprocket; and wherein
said rod-feed drive motor is a hydraulic motor; and means including hoses extending through said sprocket and communicating with said hydraulic motor; and
a rotary fluid coupling gland embodying the rotary mounting of the forward end of said carriage, said coupling gland having a rotating gland element coupled to the forward ends of said hoses and a fixed coupling part receiving fluid from a pumping means.

7. A rodding machine as defined in claim 1, wherein said carriage comprises an open frame having longitudinal side members disposed substantially in a common plane with said axis, wherein said rod-feed drive motor is mounted on one of said side members of said carriage, and wherein said rod-feed unit is disposed largely between the carriage axis and the other side member of the carriage, and largely counter-balanced by said drive motor.

8. A rodding machine as defined in claim 1, wherein said carriage comprises an open frame having longitudinal side members disposed substantially in a common plane with said axis, and said rod-feed unit comprises a drive chain having spaced drive yokes for engaging coupling joints on a jointed rod, means supporting said chain for longitudinal travel of a stretch thereof alongside the drive rod being fed, and guide means in adjacent parallel relation to said chain stretch for confining the same in driving engagement with the rod, said rod-feed unit being tilted with references to the plane of said carriage frame, with its rear end adjacent the rim of said opening.

9. A rodding machine as defined in claim 1, wherein said carriage comprises an open frame having longitudinal side members disposed substantially in a common plane with said axis, said rod-feed unit is of a roll-feed type, with its rear end in overlapping relation to the forward portion of said reel.

10. A rodding machine as defined in claim 1, wherein said carriage comprises an open frame having longitudinal side members disposed substantially in a common plane with said axis, and wherein the feed axis of said rod-feed unit is inclined with reference to the plane of said carriage and extends diagonally from the carriage axis toward one of said side members, including a rod-straightening unit comprising a roller interposed between said guide and the adjacent end of said rod-feed unit and applying pressure to the portion of rod traversing between said guide and roll-feed unit along a radius of a curve tangent to the axes of said rod-feed unit and of said guide.

References Cited

UNITED STATES PATENTS

| | | | |
|---|---|---|---|
| 2,355,733 | 8/1944 | Johnson et al. | 15—104.3 |
| 2,488,039 | 11/1949 | Sketchley | 15—104.3 |
| 3,098,251 | 7/1963 | Stewart | 15—104.3 |
| 3,176,335 | 4/1965 | Ciaccio et al. | 15—104.3 |

EDWARD L. ROBERTS, *Primary Examiner.*